US011823254B2

(12) United States Patent
Fletcher

(10) Patent No.: US 11,823,254 B2
(45) Date of Patent: *Nov. 21, 2023

(54) USER-ENABLED MOBILE SCHEDULING DIRECT TIME APPLICATION

(71) Applicant: Mary Anne Fletcher, Jackson, GA (US)

(72) Inventor: Mary Anne Fletcher, Jackson, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/576,920

(22) Filed: Jan. 15, 2022

(65) Prior Publication Data

US 2022/0215460 A1 Jul. 7, 2022

Related U.S. Application Data

(63) Continuation of application No. 17/120,180, filed on Dec. 13, 2020, now Pat. No. 11,238,525, which is a
(Continued)

(51) Int. Cl.
*G06Q 30/00* (2023.01)
*G06Q 30/0601* (2023.01)
(Continued)

(52) U.S. Cl.
CPC ..... *G06Q 30/0641* (2013.01); *G06Q 30/0239* (2013.01); *G06Q 30/0277* (2013.01);
(Continued)

(58) Field of Classification Search
CPC ........... G06Q 30/0641; G06Q 30/0239; G06Q 30/0277; G06Q 30/0619; G06Q 50/01;
(Continued)

(56) References Cited

U.S. PATENT DOCUMENTS 8,516,063 B2 8/2013 Fletcher
8,862,678 B2 10/2014 Fletcher
(Continued)

OTHER PUBLICATIONS

Crawford E., Veloso M. (2005) Learning to Select Negotiation Strategies in Multi-agent Meeting Scheduling. In: Bento C., Cardoso A., Dias G. (eds) Progress in Artificial Intelligence. EPIA 2005. Lecture Notes in Computer Science, vol. 3808. Springer, Berlin, Heidelberg.*
(Continued)

*Primary Examiner* — Kathleen Palavecino
(74) *Attorney, Agent, or Firm* — Vance Intellectual Property, PC

(57) ABSTRACT

A system and process within a mobile device and/or social media application of coordinating, scheduling and booking people to connect and have live face to face streaming meet-and-greets through the application. A network connected server maintains a database and information to Facilitate the buying and selling of direct air time between specific users within the application. Wherein Users can go on and offer time available for a live meet-and-greet and other users can then go on and book and schedule time from the said time available. The application can also be used to schedule and pay for the meet-and-greet time, facilitating live "meet-and-greets" via the application.

20 Claims, 16 Drawing Sheets

Related U.S. Application Data continuation of application No. 15/897,201, filed on Feb. 15, 2018, now Pat. No. 10,867,345.

(60) Provisional application No. 62/459,266, filed on Feb. 15, 2017.

(51) Int. Cl.

| | | |
|---|---|---|
| *H04L 12/18* | (2006.01) | |
| *G06Q 50/00* | (2012.01) | |
| *G06Q 30/0207* | (2023.01) | |
| *G06Q 30/0241* | (2023.01) | |
| *H04N 7/14* | (2006.01) | |
| *H04L 51/52* | (2022.01) | |
| *H04L 51/214* | (2022.01) | |

(52) U.S. Cl.
CPC ......... *G06Q 30/0619* (2013.01); *G06Q 50/01* (2013.01); *H04L 12/1822* (2013.01); *H04L 51/52* (2022.05); *H04N 7/141* (2013.01); *H04N 7/147* (2013.01); *H04L 12/1818* (2013.01); *H04L 51/214* (2022.05); *H04N 2007/145* (2013.01)

(58) Field of Classification Search
CPC ... H04L 51/52; H04L 51/214; H04L 12/1818; H04N 7/147
See application file for complete search history.

(56) References Cited

U.S. PATENT DOCUMENTS

| | | |
|---|---|---|
| 9,294,527 B2 | 3/2016 | Fletcher |
| 9,373,112 B1 | 6/2016 | Henderson et al. |
| 9,456,013 B2 | 9/2016 | Fletcher |
| 2006/0085318 A1 | 4/2006 | Cohoon |
| 2014/0229547 A1 | 8/2014 | Justin |

OTHER PUBLICATIONS https://www.doctorondemand.com/.

\* cited by examiner

Request time

Enter request time reason

Time requested

From  DD MM YYYY    HH:MM

To    DD MM YYYY    HH:MM

Donation/ Amount offered
_____

Request

FIGURE 6

USER-ENABLED MOBILE SCHEDULING DIRECT TIME APPLICATION

FIELD OF THE INVENTION

The present invention relates to a network-based application communication system, and more particularly to a method and application of publishing, coordinating, scheduling, and booking live streaming direct time "meet-and-greets".

BACKGROUND OF THE INVENTION AND DEFINITIONS

One of the most rapidly expanding aspects of mobile devices and live streaming involves the ability to connect people together via applications and social media in new and different ways, while making money.

It would be beneficial for there to be an application that allows users to meet-and-greet based upon mutually agreeable terms (e.g., time and money).

SUMMARY OF THE INVENTION

The present invention allows users to either provide and/or find available times, schedule, and book them for the users to be able to meet face to face in real time over a mobile device streaming media, an internet application, a mobile application interface, or a social media interface, connecting users in a new way by coordinating and scheduling real-time meet-and-greets.

The application also can optionally charge and pay for "one" of the user's time as a commodity, so the other user can pay for it. The present invention is the process of a live "meet-and-greet" application system of publishing, coordinating, scheduling, and booking live DT "meet-and-greets" with the added option of the buying and selling of users face-to-face airtime via a face-to-face live stream which can be purchased, ad sponsored, sponsored, or utilized for meet-and-greets via mobile devices, applications, social media and the Internet.

To utilize the application a user simply goes on the application and choses or lets it know the time the user has available and when. The app then opens that time up to other application users to purchase and schedule the time. The application then coordinates and schedules the time for the direct time "meet-and-greet."

In an aspect, the present invention provides a novel application that is capable of publishing, coordinating scheduling and facilitating of live meet-and-greets via a social media platform, a mobile device, Internet, and or other mobile application. Wherein the application coordinates the times available between two or more users and schedules a live meet-and-greet through or over the said application within a mobile device, application, or social media platform. While keeping track of the amount of time the meet-and-greet is for and taking or receiving a payment or compensation. This application provides users the way to pay for the opportunity and then schedule the allotted time. The opportunity can also be ad sponsored, free, or with integrated sponsorship, but it is the application of publishing, coordinating and scheduling direct "air time" "meet-and-greets" via an application. Providing social media users a way to schedule and connect with others while making money for their time.

In another aspect, the present invention provides a novel system and process for publishing, coordinating and scheduling live on air streaming media face to face "meet-and-greets" or Direct Time (DT) streaming media is provided. Preferably, these "meet-and-greets" are for Content creators and celebrities to be able to have paid and purchasable on air live "meet-and-greets" with their fans to provide them with an additional revenue stream but the present Invention can also be used by Tutors, Teachers, Psychiatrist, Musicians, Influencers or anyone looking for an additional revenue stream by utilizing the present invention to sell on air live DT time with them for an additional revenue stream, through buying and selling of direct air time. Likewise, these scheduled meet-and-greets can be free, sponsored, ad sponsored, and revenue supplemented to coordinate and schedule private one on one DT time between users.

These and other aspects, features and advantages of which embodiments of the invention are capable of will be apparent and elucidated from the following description of embodiments of the present invention, reference being made to the accompanying drawings,

BRIEF DESCRIPTION OF THE DRAWINGS

FIG. 6 shows a request time screen where a user can enter a message, date and time, amount offered, and send a request to the seller/person.

DESCRIPTION OF EMBODIMENTS

Figure 1:
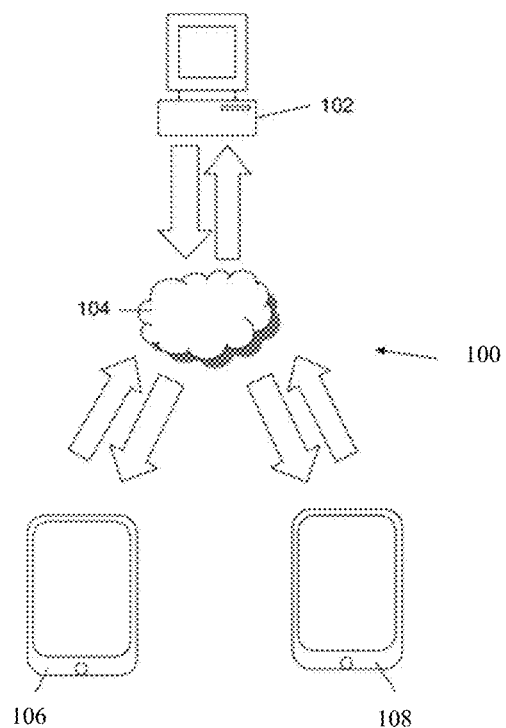
FIG. 1 illustrates (100) that the described application is cloud based by a remote server that connects users (mobile devices 106 and 108).

The following definitions refer to terms listed within the application and can be used for further explanation.

Streaming media is multimedia that is constantly received by and presented to an end-user while being delivered by a streaming provider. The name refers to the delivery method of the medium rather than to the medium itself. The distinction is usually applied to media that are distributed over telecommunications networks, as most other delivery systems are either inherently streaming (e.g., radio, television) or inherently non-streaming (e.g., books, video cassettes, audio CDs). The verb 'to stream' is also derived from this term, meaning to deliver media in this manner. Internet television is a commonly streamed medium.

Live streaming, more specifically means taking the media and broadcasting it live over the Internet. The process involves a camera for the media, an encoder to digitize the content, a media publisher where the streams are made available to potential end-users and a content delivery network to distribute and deliver the content. The media can then be viewed by end-users live.

Meet-and-greet is an organized event during which a celebrity, politician, or another well-known figure meets and talks to the public or an organized event between two or more people.

On-air—being broadcasted live—over television or a live streamed event.

Coordinate—bring the different elements of (a complex activity or organization) into a relationship that will ensure efficiency or harmony.

Schedule a plan for carrying out a process or procedure, giving lists of intended events and times: 2. an appendix to a formal document or statute, especially as a list, table, or inventory. 3. arrange or plan (an event) to take place at a particular time.

Social media websites and applications that enable users to create and share content or to participate in social networking.

Mobile device a portable computing device such as a smartphone or tablet computer. Mobile device and computer are used interchangeably.

Application the action of putting something into operation.

Commodity—a useful or valuable thing.

Direct—with no one or nothing in between.

Air time— time during which a broadcast is being transmitted.

Face to Face— with the people involved being close together and looking directly at each other or in direct confrontation.

In an aspect, the present invention provides as follows:
a. Application inputs the available live streamed direct meet-and-greet times from a user through a server, publishing available time;
b. Application coordinates and stores times (and price) available;
c. User selects and schedules desired meet-and-greet time from available;
d. Server coordinates, schedules and updates availability;
e. Server provides meet-and-greet connection at scheduled time for Direct Time;
f. Server stores and saves meet-and-greet if recorded;
g. Sever keeps track of the meet-and-greet; and
h. Server executes payments.

In another aspect, the present invention provides a novel method or application for coordinating, scheduling, and booking live streaming direct meet-and-greets between users via the application In another aspect, the live meet-and-greet has a payment option to purchase In another aspect, the applications is sponsored by a product, ad or company In another aspect, the application has a purchase button for merchandise, additional time or a future "meet-and-greet"

In another aspect, the applications meet-and-greet can be recorded shared, or saved In another aspect, the application can be bought In another aspect, the application can be utilized as a subscription In another aspect, the application experience of the live meet-and-greet can be shared to social media, text, email, and through other sharing platforms In another aspect, the application experience can be part of a social media experience as a feature In another aspect, the application can chose, schedule, receive and take payments In another aspect, the applications can schedule different amounts of time for a meet-and-greet In another aspect, the applications can connect the users for the meet-and-greet In another aspect, the application keeps track of the times for and during the meet-and-greet In another aspect, the application coordinates and schedules the meet-and-greet through time available In another aspect, the application connects the users at the time of the live meet-and-greet for the meet-and-greet itself In another aspect, the application is a face to face live meet-and-greet through a mobile device, social media, internet or other form of connecting device within a social media frame.

In another aspect, the application can have in app purchases

In another aspect, the application can coordinate and schedule time immediately or in the future In another aspect, the application automatically calls, notifies or connects the people for the meet-and-greet at the time of the meeting.

In another aspect, the application receives a payment after scheduling a meet-and-greet In another aspect, the application receives a payment during or following said meet-and-greet In another aspect, the application automatically ends the meet-and-greet after the allotted time In another aspect, the application allows users to keep information including telephone information private through the connection In another aspect, the application keeps track of pervious meet-and-greets with the option to provide that information In another aspect, the application is paid informative time purchased by one user for or with another user. Ex a lesson or tutor In another aspect, the application can be used by a person to schedule a meet-and-greet as a gift for another or use a prepaid gift certificate In another aspect, the application asks questions or has a spot to give info prior to the call for the reason of the call In another aspect, the application is a method In another aspect, the application is a method within a social media platform In another aspect, the application is a method within a application on a mobile device or web interface In another aspect, the application can be performed with 2 or more people at once In another aspect, the application can have a chat or comment interface In another aspect, the application can have the ability to file share, gift, tip, donate, message, shop or purchase interface within it.

In another aspect, the application can be executed first and paid for after for allotted time In another aspect, the application keeps track of time used and completes a payment for said time at completion or later.

The present invention is the method and application to schedule, coordinate and connect direct meet-and-greets through live streaming in real time through a mobile device or social media platform for a face-to-face live meet-and-greets via the application. The application allows users to provide their time available and/or find time available and schedule said time for the users to be able to meet face to face in real time via an application on a mobile device, Internet, or social media interface.

The application provides users the ability to charge and pay for "one" of the user's time as a commodity.

The application then coordinates through a server for publishing, scheduling, and booking live meet-and-greets which can then either be purchased, ad sponsored, sponsored, or simply utilized for one on one meet-and-greets via mobile devices, applications, social media or the internet.

The application works by publishing, keeping track, coordinating and scheduling the initial user's information, times available, and price for time, preferably down to the minute, in a database server. Other users who are then seeking time with said user for a "DT" or "meet-and-greet" can then come on the application and chose from the offering user's allotted time available. Once the receiver has chosen the time they can then pay for the time or upload their payment information and complete the scheduling and purchasing the live meet-and-greet at coordinated time.

Then when it is time for the meet-and-greet the application can connect them together for a private Direct Time meet-and-greet, in which the application keeps track of and ends the meet-and-greet after the allotted time Providing the best use of the user's time and making sure that the purchaser user must either rebook, or repurchase then additional time (if available).

The application can also publish, schedule and coordinate a meet-and-greet, keep track of the time of the meet-and-greet if not a fixed amount and facilitate the payment at the end of said time.

The application itself keeps up with the time available. Then allows users to purchase said time available for the private meet-and-greet. Coordinating, scheduling and Facilitating the private face-to-face live virtual meet-and-greet itself.

The person offering the meet-and-greet is referred to as the offeror or seller, can also set his price then and go live for meet-and-greets then to be scheduled. Wherein his or her fans can receive a text push notification notifying them that they are live and taking meet-and-greets then. So, the offeror's fans can come on to the application then to schedule and buy DT time with them then or later. If a seller/offeror is offering meet-and-greet time then, any user can come to the app to schedule said time, unless they have been blocked by John Smith or the application for a specific reason, such as bullying or inappropriate conduct.

When doing so they see the cost of his time, preferably by the minute, and chose the amount of time they want. After they chose the amount of time they want, they can see if the offeror/seller has room in his cue then to utilize the said time then to book it, if they do not, the fan/users can schedule from allotted time later when the seller/offeror has it available, through scheduling via the application.

The application also can schedule time then and fill the offeror/sellers schedule of allotted meet-and-greet time. For ex: A social media influencer decides to go on call for live "meet-and-greets" then. He sets the amount of time he is going to be on the application for live "meet-and-greets" and the price per his time per minute with the option to add a sponsor. He publishes his time and the application then notifies the influencer's fans that he or she is live and available then and can scheduling meets and greets. Wherein the user's fans come over and schedule and buy said meet-and-greet available through scheduling within the application and get a live meet-and-greet, when it is their scheduled time.

The application provides the ability to always publish, coordinate, pay (when applicable) and schedule, booking the meet-and-greet time, from within the application. The application keeps track of all the information in a network-connected server to coordinate said times for specific meet-and-greets. Then the application facilitates the payment of buying said direct time for the meet-and greets time before or after time is used.

The application can also publish, coordinate, schedule and book free meet-and-greets for our users to provide a great fan experience. Likewise Meet-and-greets can be company sponsored, product sponsored, or brand sponsored or supplemented by ads. Meaning a company or product can sponsor the said "air time" DT making it free. Wherein the application users can simply come on the application and chose from said times for a DT, schedule and confirm it. The application then sets up the time and confirms the DT.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein The terms meet-and-greet, Direct Time, on-air, or face-to-face are used interchangeably in this specification and generally refer to the face-to-face meeting via a real time audio, video, or a combination thereof streaming, including live streamed sent across the internet, web, mobile device, social media, or application. In one aspect of the present invention, the system can be used for any media user person type, such a teacher, a tutor, a psychiatrist, a motivational speaker, a instructor, a celebrity, a influencer, a content creator, a gamer, a fan or other said person who wants to offer, publish, or purchase one on one direct air time. In another aspect of the present invention, the system is used for coordinating scheduling and booking live meet-and-greets- for content creators, celebrities, sponsors, brands, companies and advertisers to safely make money and interact with users, clients and fans.

The Drawings Illustrates an example meet-and-greet coordination system, where according to the present invention allows network connected devices, such as mobile devices, (cell phones, portable music players, tables, laptops, wearables, social media platforms etc.), to publish and coordinate times for specific meet-and-greets to be streamed and provided via application users (e.g., coordinating the meet-and-greet through live real-time media data). Generally, a computer server as demonstrated in FIG. 1, (e.g., a processor, RAM, a hard drive, an operating system, cloud, web serving software and database software) is connected to a wide area network such as the Internet or wireless cell phone data network. Mobile devices are also connected to the cloud server network simultaneously allowing for communication to and from the server FIG. 2 shows the profile page and user interface functionality of an embodiment of the present application from the "buyers" point of view. A user either executes the mobile media application on their mobile device through an application, on social media, or uses a browser to browse to an Internet page or profile page supplied by the server. Then the application downloads the current meet-and-greet information (i.e., the parties scheduled for meeting live at that time) from the server. The status Button shows if a user is busy, available, or away then. The connect camera button opens a connection at time of greet-and-meet it can also be automatically opened via push notification at time of meet-and-greet and/or through an automatic connecting live stream video call. About me and reviews are optional for multiple uses and functionality for white labeling. Selecting "Buy Time" takes the user to the scheduling page to buy "Direct Air Time".

Figure 2:
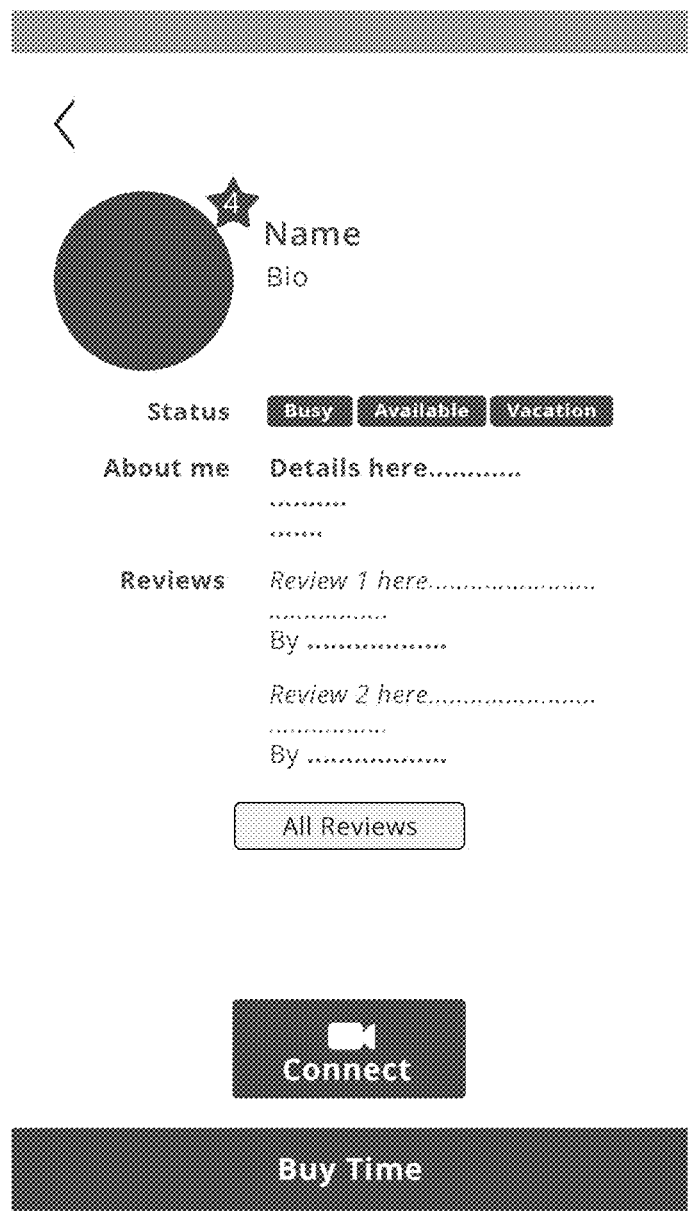
FIG. 2 shows an information and buy time or get direct time interface according to an embodiment of the present invention as well as a camera to connect as a portal.

Alternately, the server FIG. 1 may automatically push the meet-and-greet or link to the current media message via push notifications, email, text messages, or pop up notifications. Notifying the user of the meet-and-greet In one example, the meet-and-greet time is scheduled to the mobile device or social media platform and is performed as a direct meet-and-greet feed that is live and immediate as requested by the user. In another example, scheduling is achieved for in the future through use of a server, which will connect the two parties live for their meet-and-greet at the time of the appointment. Delivery of the live meet-and-greet is achieved with a live streaming media file (e.g., streaming audio/video) that provides images, text and/or audio via a live stream to both the user's mobile device in real time via the device camera and microphone. In this respect, the meet-and-greet is a live stream similar to a live television station having a face to face meeting from two or more separate devices or platforms, wherein the users can communicate and interact together through the applications interface.

Figure 13:
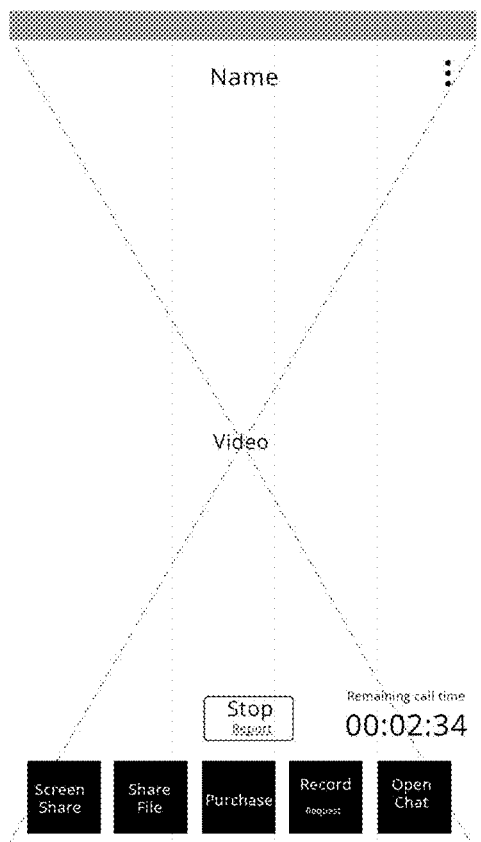
FIG. 13 illustrates a coordinated and prescheduled live video stream face to face connected meet-and-greet.

In FIG. 13, the mobile social application displays the meet-and-greet data supplied by the server FIG. 1. This data may include the time of the meet-and-greet, an attached or linked-to media file, price or payment information and meet-and-greet expiration information (i.e., when the current meet-and greet expires causing the mobile social application to automatically switch to a new current meet-and-greet). Alternately, the meet-and-greet data date and time may be a live media stream, previously scheduled by the server FIG. 1, which displays the information, data, images, text, audio, video, live stream or other items in a common media format (e.g., h.264 mp4 video format). In one preferred embodiment, the meet-and-greet is utilized for content creators, celebrities and fans within a social application to meet and interact through preferably paid direct time opportunities.

FIG. 13 shows a live Video stream face to face connection. The stop report button ends the connection, wherein a user can make a report. Other optional features include the timer keeps track of bought time. The screen share button allows for screen sharing opportunities. The share file button allows users to share information. The purchase button allows users to make a purchase from a user record meet-and-greet. The open chat button allows the user to send info to a person.

In FIG. 13, the user views the media meet-and-greet data in real time through an interface of the mobile application and interacts with the interface. For example, the user may add a tip, a donation, leave a comment, make a purchase, request recording, or share a link to the DT Meet-and-greet via a social network, email, text message or similar communication. The user may also make purchases within the application (e.g., in-app purchases, credit cards, PayPal®, etc.) to buy gift certificates for meet-and-greet air time, give a meet-and-greet as a gift, buy a virtual or actual item via the meet-and-greet, or similar in-application items.

Figure 4:
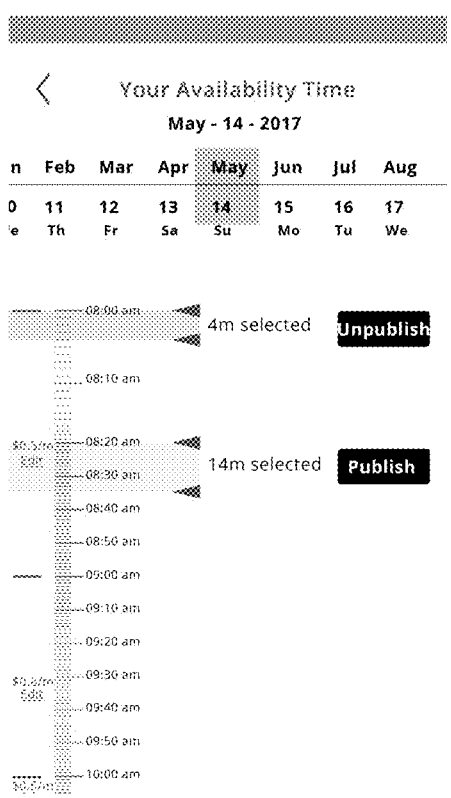
FIG. 4 illustrates an information and time coordination system according to an embodiment of the present invention.
Figure 5:
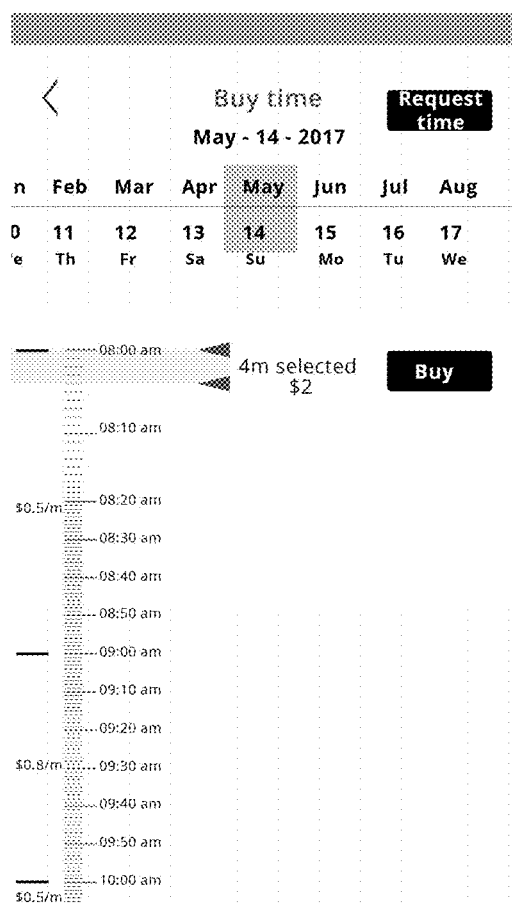
FIG. 5 illustrates a direct airtime schedule or purchase according to an embodiment of the invention and also illustrates a request time feature.
Figure 8:
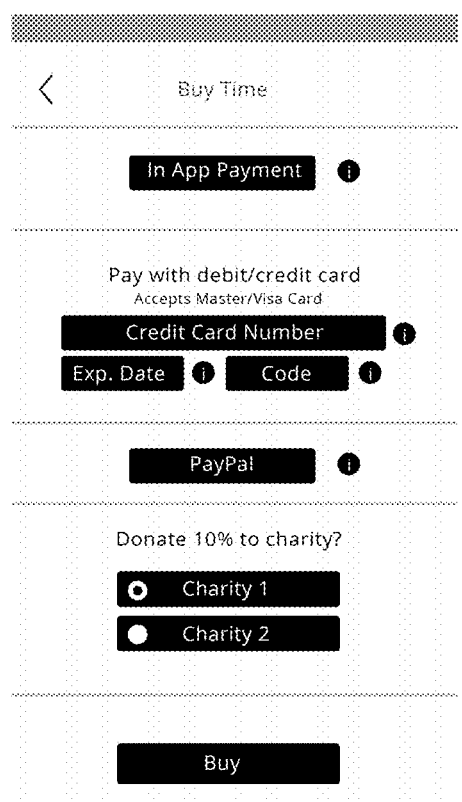
FIG. 8 illustrates a payment interface according to an embodiment of the present invention.

In FIGS. 4, 5, and 8, the user can coordinate, schedule, book and pay for a custom meet-and-greet that is stored and rendered from the server FIG. 1. The server will similarly connect the custom meet-and-greet at the specified time as the meet-and-greet appointment, thereby facilitating that media meet-and-greet DT through the booking confirmed users of the mobile application, social media implementation or website.

Figure 3:
FIG. 3 shows a sellers' profile page for editing and scheduling time whether they are busy, available, or on vacation (away). The bottom button takes you to screen where you can post/publish and make time availability.

The figures illustrate a flow chart of an example process for publishing, coordinating meet-and-greets DT. As seen in FIG. 3, the mobile application is executed on the mobile device FIG. 4 that can download available times that a meet-and-greet DT can be scheduled. A user can request availability of a specific time FIGS. 5, 6, & 7 or the mobile application can download a variety of free times within the allotted time segment.

Figure 7:
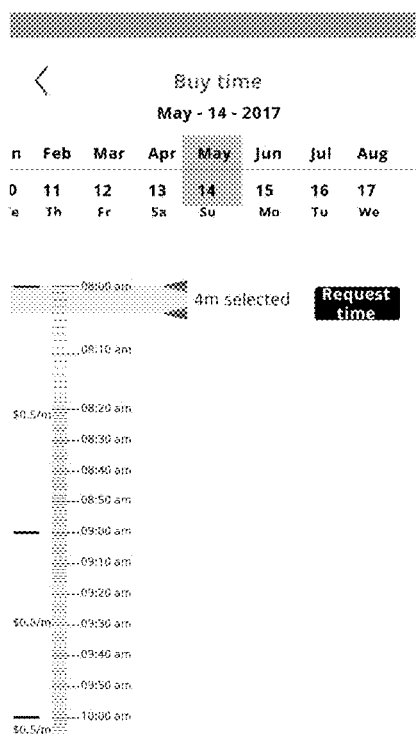
FIG. 7 illustrates an alternate version of the request time feature option.
Figure 9:
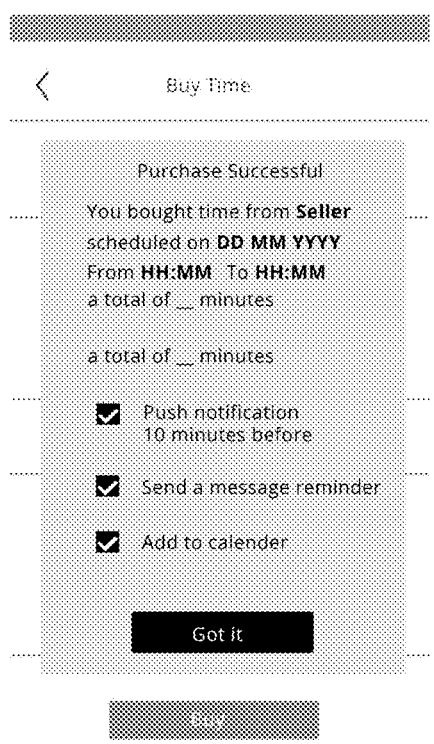
FIG. 9 shows the confirmation pop-up for the buyer of the meet-and-greet confirming date and time. There is optional add to calendar, send a message reminder, push notification prior.
Figure 10:
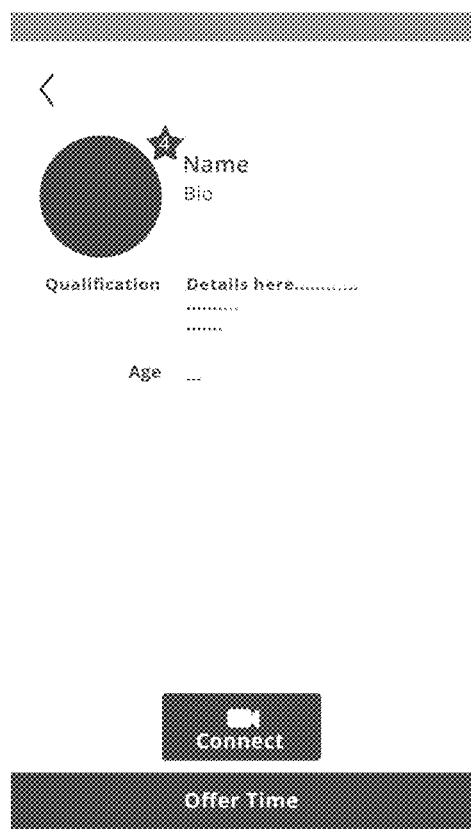
FIG. 10 shows a seller's profile page with offer time and a connect portal for live stream Direct Meet-and-Greet.
Figure 11:
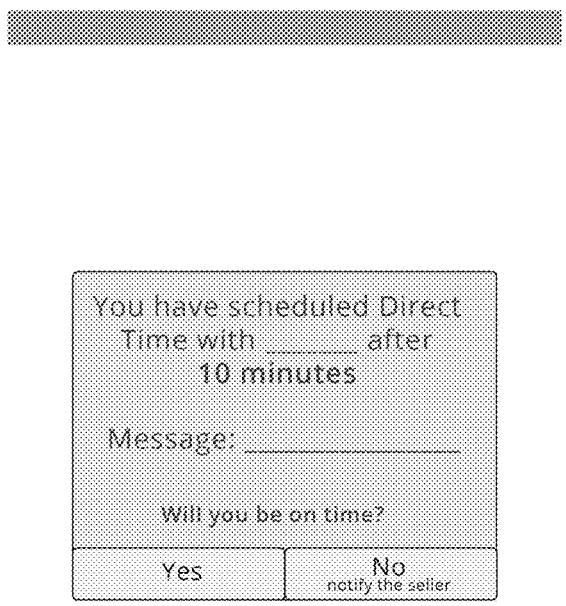
FIG. 11 illustrates a notification of an upcoming live meet-and-greet on the buyers' side confirming (good for students, and people who take on air lessons).
Figure 12:
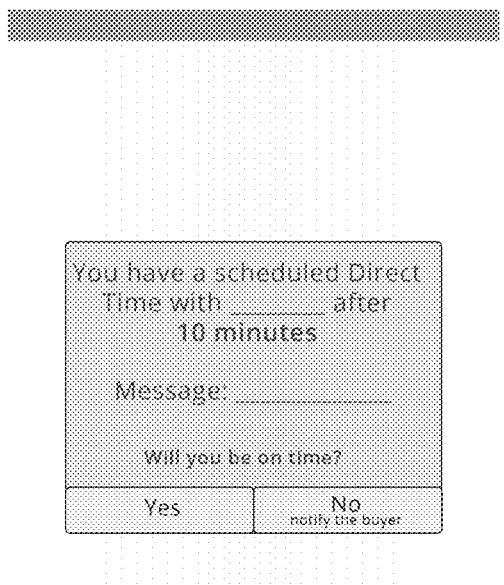
FIG. 12 illustrates a notification of an upcoming live meet-and greet on the sellers' side confirming (good for tutors, teachers, on-air instructors who sell direct time).

In FIGS. 7, 8, & 9, the user selects a time that they would like to have their meet-and-greet confirmed, the text if any information for the greeter, any images or information that they would like to accompany the live meet-and-greet, and payment information. This data is uploaded to server FIG. 1 and stored in a database FIG. 1.

Figure 14:
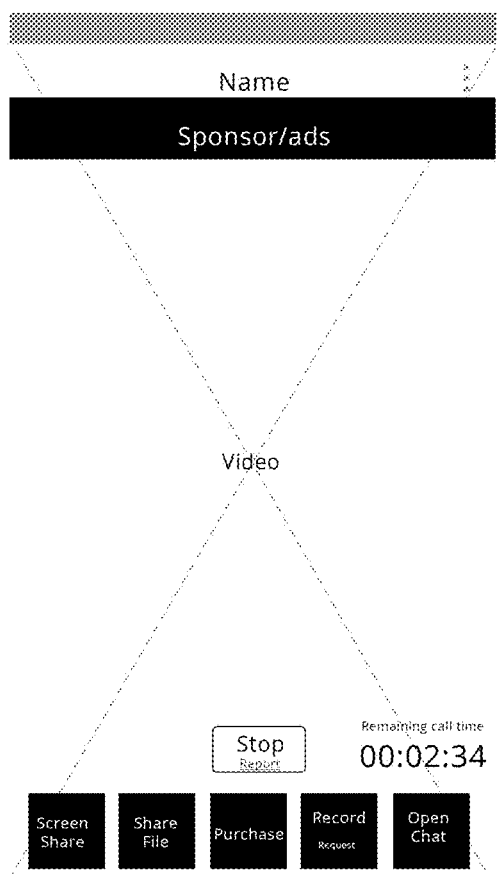
FIG. 14 illustrates a meet-and-greet with media content sponsorship interface according to an embodiment of the present invention.
Figure 15:
FIG. 15 shows an optional review of meet-and-greet (ideal for tutors, instructors, etc. or for messages from fans).
Figure 15:
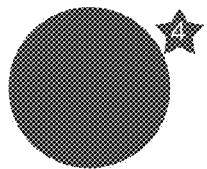
Figure 15:

As seen in FIGS. 13 & 14 the sever FIG. 1 provides meet-and-greet data according to the scheduled time. This data can be rendered and streamed as a live streaming format, made available for download to each meet-and-greet participants mobile device FIG. 1 running the application or can be sent out via a push notification, email or text message. Optionally, the push notification, email or text message can include a link that opens the mobile meet-and-greet application to that specific meet-and-greet or to a webpage displaying that meet-and-greet at time of meet-and-greet. To facilitate live meet-and-greet through the application.

The meet-and-greet can also be displayed on any participating social media platforms. For example, an otherwise nonaffiliated social media platform or website could include code that displays the meet-and-greet opportunity or a recorded version if saved. In another example, the meetand-greet can be posted to a social media site, such as Facebook or Twitter, which allows users to subscribe. In this respect, people visiting websites otherwise unrelated to the server FIG. 1 can also view the meet-and-greet either in real-time or in post-time via a link.

FIGS. 2-16 illustrate various example aspects and interfaces of the mobile social meet-and-greet application according to the present invention. FIG. 2,13 illustrates the current meet and-greet interface FIG. 13 that displays the meet-and-greet when scheduled by the server FIG. 1. The current meet-and-greet interface FIG. 13,14 preferably includes a meet-and-greet text display that displays the text of the meet-and-greet specified by person who created the current meet-and-greet and name of participants.

Optionally, the current meet-and-greet interface includes an advertisement or sponsorship banner FIG. 14 for displaying advertisements either in house, from connected servers or from a downloaded source, such as from Google® AdSense or Apple® in-app advertising or another sponsorship or ad share opportunity. Optionally, the mobile meet-and-greet application can allow a user buyer or seller can maintain the option to include this banner FIG. 14 during the media meet-and-greet creation process to financially subsidize the price of posting the media message and sponsors can use the meet-and-greets for ads, promotions or other opportunities to interact with users.

The interface can also include a comments button that displays a comment interface for leaving messages related to the meet-and-greet. A past meet-and-greet button is also including for displaying a list of past meet-and-greets or bookmarked meet-and-greets for saving or sharing videos.

The application is scheduling a multitude of meet-and-greets that are available to the mobile application. For example, some meet-and greets can be specific for content creators, some for gamers, some for celebrities, some for a causes, some sponsored, some for teachers, instructors, preachers, companies, brands or more. Selecting a button on a users profile page or a coordinating and scheduling interface allows the user to switch between these meet-and-greets available and meet with the optimal person a user wants to connect with.

The donate or tip button FIG. 13, 14, 15 allows the user to donate and tip money to originator of the meet-and-greet, or charities if sponsored, thereby allowing users or entities to raise money in addition to soliciting meet-and-greets. The buy gift button FIG. 13,14,16 allows the user to buy items for or from the author of the current meet-and-greet or another user. Gifts can include the recorded meet-and-greet, still images, virtual greeting cards, gift certificates, message airtime, as well as actual and virtual goods. The buy airtime button FIG. 8 displays an interface for creating and purchasing a meet-and-greet or virtual, actual item that will be displayed on the application The about me interface FIG. 2 preferably includes information about the seller, celebrity or content creator offering the meet-and-greet. A share button allows the user to share specific meet-and-greet information with others (e.g., by emailing text of the media message information The go back button or arrow returns the user to the previous screen.

If the user selects the buy meet-and-greet direct time button FIG. 2 in interface FIG. 2-9 the buy meet-and-greet direct time interface is displayed, as seen in FIG. 8 publish available direct time FIG. 4 allows a seller to enter pertinent information for their meet-and-greet times available for the server to schedule, while FIG. 5 allows buyers to find available direct time to schedule. Optionally, the user can attach or add a link to an image, audio and/or video in a media input to either the seller or the buyer of the meet-and-greet. (Or the offeror and receiver.) This media is uploaded to the server FIG. 1 and rendered in to facilitate the meet-and-greet at the scheduled time. The purchase successful popup button FIG. 9 displays the meet-and-greets information with optional features.

The buy direct time FIG. 5, 7-selection interface preferably provides a plurality of selectable time ranges (e.g., slide down or checked boxes) and their accompanying cost. For example, FIG. 5 shows sellers available time via date in Green, non-available in Black, and Booked in Red. The request time in the corner takes user to a different screen wherein a user can request time from the seller/person A minute input offer or a request time feature (see FIG. 6) allows the users (buyers) the ability to specify the amount of time the user would like their meet-and-greet- to be at the current meet-and-greet sellers (offerors) price.

The meet-and-greet feature has advanced direct time scheduling interfaces such as providing the seller/use control over exactly when the meet-and-greet will happen as the current meet-and-greet. For example, a date interface FIG. 6 allows the user to specify a specific day for scheduling the meet-and-greet, and the time interface FIG. 6 provides more detailed time ranges, and the time interface allows input of the amount of time the meet-and-greet will happen as the current meet-and-greet. Wherein the server can automatically serve up available times in the seller's upcoming schedule.

Once the server FIG. 1 has found a free time according to the criteria selected by the user, the preview interface is displayed, as seen in FIG. 8. With the proposed meet-and-greet date and meet-and-greet price wherein the user can purchase FIG. 8.

The payment interface FIG. 8 allows the user to select their desired method of payment. This interface can be used for buying the DT meet-and-greet time or for any other activity that may require payment (e.g., purchasing gift certificates or gifts, giving tips, or other in-app virtual or actual purchases).

For example, the user can select the in-app payment button (see FIG. 8) to cause payment through an "in-app" payment system, such as Apple's or Androids' in-app payment system. The user may also enter their credit card information in the credit card input or can select the PayPal® button to bring up PayPal® login credentials for payment via PayPal® or another payment service such as Stripe®, Bitcoin or another. The user can always return to previous interfaces via the go back button or via closing down the page or they can compete the purchase. Likewise, the server can keep payment information and complete payment after the direct time meet-and greet based on the allotted amount of time. FIGS. 13 &14

Once the payment information has been submitted and confirmed by the server FIG. 1 the confirmation interface is displayed, as seen in FIG. 9. A confirmation message is displayed at the top of the interface to confirm the exact time the meet-and-greet will take place. Additionally, pluralities of media sharing buttons are displayed to allow the user to easily share details (e.g., date, time, and booking information) to the live meet-and-greet on various calendar, email, text message or social media websites.

FIGS. 4 &14 illustrates an alternate meet-and-greet interface according to the present invention. The interface allows a user or organization, brand, (Ex movie) to post a meet-and-greet opportunity experience via media (music, video, image, etc.) This meet-and-greet experience can be purchased through an interface similar to those previously described in this specification and in another option it could be held in either virtual space or actual space in real time. Optionally, an advertiser may sponsor such a stream and post their ad banner in the banner display FIG. 14

The interface also displays live or regularly updated comments and meet-and-greet information from users throughout a live direct time stream display FIG. 13,14. If a user wishes to comment/chat, share a file (or similar link) these features can be selected, prompting the user for a chat opportunity, make a purchase or leave a tip. Alternately, the user can select the purchase button or a tip button to donate money or make a purchase without adding a comment (e.g., utilizing the payment interface).

FIG. 14 illustrates a sponsor interface that allows an advertiser or user to sponsor a specific current meet-and-greet. A meet-and-greet selection input downloads and displays from the server FIG. 1 a list of meet-and-greet and sponsor prices that are available for sponsorship. A specific meet-and-greet can be selected and the sponsor's ad banner can be uploaded to the server FIG. 1 by clicking the add banner button 214. Once the user is satisfied by their selection, the checkout button FIG. 8 can be used to pay.

Figure 16:
FIG. 16 illustrates an optional interface for in-app purchases of items according to an embodiment of the present invention

FIG. 16 illustrates an optional item purchase feature interface that allows the user to make in-app purchases of items via the item selection interface This allows the user to select a desired item (real or virtual) for purchase, then select the check out button which leads to the previously described payment interface.

In one specific example, the present invention can be particularly used to facilitate an optimal fan experience meeting their idol. For example, users can purchase meet-and-greet direct airtime figure to meet their favorite celebrity. In another example, a celebrity can utilize this functionality to make added revenue and connect safely with their fans through meet-and-greet within the mobile application selling their time to their fans as a commodity.

In another specific example, the present invention can be used to purchase meet-and-greet for a teacher, an instructor or another professional to schedule and make additional prepaid income.

In another example according to the present invention, the server can provide a user or company with his or her own ability to control directly who gets the DT meet-and-greets. FIGS. 13 & 14 In this respect, the greeter/influencer/celebrity can hold contest or promotions to facilitate the time or a sponsorship brand or company can hold contest to see who gets it. This option provides this third-party control of the meet-and-greets direct time stream, FIGS. 13 & 14 allowing the meet-and-greet creator to designate airtime available, FIG. 7 and which people are approved, as well as additional items for purchase. This is particularly useful for causes and charities to make money by offering different meet-and-greet times with different celebrities through the use of their direct time meet-and-greet channel.

FIG. 7 illustrates another specific example of the present meet- and-greet application when scheduling and correlating direct time. The application can coordinate and connect the meet- and-greet first, FIG. 7 then take a payment prior FIG. 8 and keeping track of the time spent throughout the meet-and-greet as shown in FIGS. 13 &14 to deduct the amount automatically from the buyers or users account for time spent, after the end of the meet- and-greet.

FIG. 7 shows an alternate version of request time on the same screen as the buy screen wherein the buy Button can switch to request button. FIG. 7 shows this if the area is in black.

In this example of the meet-and-greet application banking information is stored in the server FIG. 1, wherein the deductions for the meet-and-greet are automatically deducted after the meet-and-greet is over, this aspect is particularly good for tutors or teachers and other meet-and-greet users who need accounts, wherein clients prefer to pay after the meet- and-greet not knowing the amount of time they will need. The meet-and-greet functionality still keeps track of users time. As demonstrated in FIG. 13. The application still schedules, provides the rate for the time, as well as connects the users. As demonstrated in FIG. 7 simply storing, taking, or receiving the payment or a another form of compensation and deducts or keeps track of it to receive after the sessions over, depending on the amount of time used.

In another embodiment of the meet-and-greet the application can merely schedule and correlate time as seen in FIG. 7 and facilitate the meeting through the direct time meet-and-greet wherein the meet- and-greet is ad subsidized or sponsored throughout the time, providing a specific user potentially a portion of the ad revenue profits. As shown in FIG. 14

FIG. 8 illustrates the purchase screen wherein another version of the direct time meet-and-greet users can purchase as seen in FIG. 8 prepaid time gift certificates of direct air time wherein the application simply deducts from the prepaid card for a specific user, or gift certificate at the end of the meet-and-greet for the amount of time used. An example of this is when someone gifts a friend direct time with his or her favorite Content creator FIG. 6 illustrates the option for a user can make a request to another user for a specific meet-and-greet at a certain time for a certain amount. If the user accepts this request the meet- and-greet is scheduled. As seen in FIG. 6

The figures show how users can utilize the direct time meet-and-greet application as a safe and simple new way to connect through social media. Wherein a user's private information is keep private protecting the safety of the users to safely schedule and connect via direct time. Wherein the meet-and-greet will connect the users automatically at time of the meet- and-greet, opening them up to the connection. As shown in FIGS. 13 and 14

The meet-and-greet application can coordinate, schedule and receive payments for in person actual meetings as well as seen in FIGS. 7 and 8 but the application is intended to connect schedule coordinate and facilitate live face to face direct virtual meet-and-greets via a social media application implementation as shown below.

The interface in FIG. 7 provides a person the ability to schedule then or later, depending on time availability.

While FIG. 5 illustrates where a person who wants a specific users time for a meet-and-greet can chose from the times available via the application and schedule confirming the live "meet-and-greet" Wherein, The application then coordinates both users with the meet- and-greet providing the schedule and takes the payment FIG. 8 facilitating the opportunity for the two to have a live "meet-and-greet" via a mobile device, the Internet, or another social media application. FIGS. 13 and 14

The application allows a specific user to provide the times they are available for meet-and-greets (see FIG. 4) and while another embodiment allows other users to choose from that said available time coordinating and confirming a meet-and-greet (see FIG. 5). For example, FIG. 4 shows scheduling availability to edit times available and price per minute for a seller.

Then within another embodiment of the invention there is a payment capacity FIG. 8 wherein the user can get paid for the meet-and-greet via a user buying and confirming air time with the person for a meet-and-greet. FIG. 9

This invention facilitates the opportunity for users to connect safely and openly online through the application, while making money. FIGS. 13 and 14.

The application allows the "time offeror" the ability to both set the date, time and amount of time they have available as well as set a price for that time available, preferably by the minute. FIG. 5 Then when a fan/buyer user comes on to choose from the time available, they can then see the sellers/offerors price and decide how much time they would like to purchase, depending on the price and their budget, for the direct time meet- and-greet or search through the seller's available meet- and-greet time FIG. 7

The applications interfaces allow the server to schedule and take a payment FIG. 8 or integrate the meet-and-greet with ads and sponsorships for potential compensation as well as enhanced fan experience. FIG. 14

In another aspect, the present invention provides a novel method or application for publishing, coordinating, scheduling, and booking live streaming direct meet-and-greets between users and mobile devices, comprising: instructions to perform this method, wherein the application provides the mobile device and the user thereof with the ability to publish direct time with optional flexible "price" and "time increments" and also the ability to automatically connect or disconnect with other mobile users based on the above chosen "price" or "time increments". The time can be booked via an inputted schedule in the application, by selecting the "available" (or live) button, or by responding to a direct request (e.g., direct message transmitted via the app).

In another aspect, publish/post, as used herein, means the ability for users to communicate to a third party and offer their Direct time meet-and-greets as a live experience that is either published available or offered via a post. The application provides the novel ability to provide all users both buyers and sellers from within the same application with the first-time ability to both publish, schedule, sell, buy, and connect their available time from directly within the app. This time can be sponsored, gifted, offered for free, or sold.

There are other apps, e.g., Doctor on Demand, where users (e.g., buyers) can buy or book a service or live connection but none wherein the users (e.g., seller) can post or publish their time available to sell or offer from directly within an application, wherein other users can buy or utilize. With other apps, all seller/users information is added from outside the app not through the app directly. The present application provides all users, both sellers and buyers, with this novel first ability to publish and sell their own time from directly within an app on a mobile or computer device directly and with the first time ability to set and control their own schedule, price, sponsorship, and time increments. The app then automatically connects and disconnects the live connection, based on user settings, from within the app.

To further clarify, "Doctor on Demand "only provides the users (e.g., sellers and buyers) with fixed prices and pre-set time increments added from outside the app. There is no flexibility from within the app directly for the users (e.g., sellers or buyers) to set or input their own price and availability down to the minute, automatically.

In another aspect, the present invention provides the novel ability for mobile users to publish available time from within an application and have that time booked to automatically connect and disconnect with others from within the same application.

In another aspect, the present invention provides the novel ability for mobile users to publish available time utilizing a schedule from within an application and then have other users within the same app (on their respective mobile device) be able to schedule said time to automatically connect and disconnect with users around available time coordinating with a computer or mobile devices geo-location, clock, server, and schedule directly interacting with the mobile device schedule.

In another aspect, the present invention provides the ability to change and set price or time increments and post available time around schedule. The application allows for the price to be changed down to a minute. The application allows for the time increments to be changed. The application allows for the both the price and time increments to be changed.

In another aspect, the present invention provides the ability to publish available time and schedule available time automatically, and then to later automatically connect and disconnect within the same app at the set time.

In another aspect, the present invention provides the ability to set "time increments" or "price" to become available now, wherein users can meet with seller/publisher on a first come first serves basis.

In another aspect, the present invention provides the ability to set a reserve price by the minute, wherein users can request a seller's time if they meet the reserve.

In another aspect, the present invention provides the availability of the above features for automating, publishing, and scheduling "direct time" with the ability to keep track of all monies in and out through a user's bank within the application.

In another aspect, the present invention provides a novel mobile device configured to run the present meet-and-greet application, the device, comprising:
 a display;
 a communications module;
 a processor; and,
 a memory, comprising: the meet-and-greet application instructions;
wherein, when executed, the instructions:
 a. provide a seller graphic user interface (see the figures), wherein the seller user interface provides the seller the ability to:
  i. publish time available for a meeting for a buyer to select;
  ii. automatically connect and disconnect via video (e.g., directly through the mobile device's camera or via another application on the mobile device) or a live connection (e.g., directly through the phone on the mobile device or via another application) with a buyer based on an agreed upon time;
  iii. optionally, set specific or flexible price increments;
  iv. optionally, set specific or flexible time increments; and,
  v. optionally, directly message a buyer;
 b. provide a buyer graphic user interface (see the figures), wherein the buyer user interface provides the buyer the ability to:
  i. see the availability of a seller (e.g., via a calendar connected to the application or via a notification from a followed seller);
  ii. schedule a live meeting with a seller based on the available time of a seller;

iii. automatically connect and disconnect via video (e.g., directly through the mobile device's camera or via another application on the mobile device) or a live connection (e.g., directly through the phone on the mobile device or via another application) with a seller based on an agreed upon time;
iv. optionally, select a price for the meeting;
v. optionally, select a length of time for the meeting;
vi. optionally, follow a seller; and,
vii. optionally, directly message a seller.

In another aspect, the present invention provides a novel mobile device configured to run the present meet-and-greet application, the device, comprising:
a. provide a seller graphic user interface, wherein the seller user interface provides the seller the ability to:
i. publish time available for a meeting for a buyer to select;
ii. automatically connect and disconnect via video or a live connection with a buyer based on an agreed upon time;
iii. set specific or flexible price increments;
iv. set specific or flexible time increments; and,
v. directly message a buyer;
b. provide a buyer graphic user interface, wherein the buyer user interface provides the buyer the ability to:
i. see the availability of a seller;
ii. schedule a live meeting with a seller based on the available time of a seller;
iii. automatically connect and disconnect via video or a live connection with a seller based on an agreed upon time;
iv. select a price for the meeting;
v. select a length of time for the meeting;
vi. follow a seller; and,
vii. directly message a seller.

In another aspect, the present invention provides additional optional features, which include one or more of the following:
i. The ability to request a user's time for a direct meet-and-greet and offer their own price.
ii. The ability to block a user within a meet-and-greet.
iii. The ability to send a tip.
iv. The ability to write an optional review.
v. The ability to make purchases actual and virtual through the meet-and-greet or after.
vi. The ability to work with advertisers, brands, promotions, and the like to interact with the application.
vii. The ability to keep track of all said monies in and out via an interactive bank in the application.
viii. The ability to work in and with any currency whether virtual or actual.
ix. The ability to connect and disconnect via a notification.
x. The ability to send notifications around key features within app including push notifications of scheduled and available time.
xi. The ability to share available times and schedule via social media, text, email, and SMS.
xii. The ability to receive/win promotional merchandise, coupons, discounts, gifts both virtue and actual, prizes, and memorabilia.
xiii. The ability to save and record interactions and share to social media, texts, and emails.
xiv. The ability for another user to purchase and schedule a meeting for someone else.
xv. The ability to buy and send a meeting as a gift.
xvi. The ability to add more than 2 users to a meet and greet.
xvii. The ability for meet and greet to be scheduled and coordinated to take place virtual or actual wherein users can meet in person.
xviii. The ability for meet and greets to take place in or utilize multiple mobile technologies such as wearables, google and snap glasses, virtual reality, artificial intelligence, and other forms of useable technology.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

The invention claimed is:

1. A mobile device configured to run a meet-and-greet application, the device, comprising:
a display;
a communications module;
a processor; and,
a memory, comprising: the meet-and-greet application instructions;
wherein, when executed, the instructions:
a. provide a seller graphic user interface, wherein the seller user interface provides the seller the ability to:
i. publish time available for a meeting for a buyer to select;
ii. set specific or flexible price increments;
iii. set specific or flexible time increments; and,
iv. accept a buyer's offered meeting;
b. provide a buyer graphic user interface, wherein the buyer user interface provides the buyer the ability to:
i. see the availability of a seller;
ii. schedule a live meeting with a seller based on the available time of a seller;
iii. select a price and length of time for the meeting;
iv. pay the price of the selected meeting or a meeting offered to and accepted by the seller;
v. request a live meeting with a seller; and,
c. automatically connect the buyer and seller via live video at the selected time; and,
d. automatically disconnect the buyer and seller from the live video at the end of the previously purchased time.

2. The mobile device of claim 1, wherein the buyer's request for a live meeting, comprises an offered time and length of time and optionally a price for the offered meeting and the seller can accept the offered time and length of time and, optionally, a price if offered.

3. The mobile device of claim 1, wherein the buyer user interface provides the buyer the further ability to:
vi. purchase additional time during a live meeting.

4. The mobile device of claim 1, wherein:
the buyer user interface provides the buyer the further ability to:
vii. follow a seller; and
viii. directly message a seller; and
the seller user interface provides the seller the further ability to:
v. purchase additional time during a live meeting.

5. The mobile device of claim 1, wherein a seller publishes time by inputting into a calendar-like function, publishing that they are currently available, or by responding to a message from a buyer.

6. The mobile device of claim 1, wherein the mobile devices of the seller and buyer are coordinated via geolocation.

7. The mobile device of claim 1, wherein a plurality of buyers, sellers, or both can participate in a meeting.

8. The mobile device of claim 1, wherein the meeting can be scheduled and coordinated to take place virtually or in person.

9. The mobile device of claim 1, wherein meetings can take place in or utilize wearable mobile technologies that allow for virtual reality.

10. The mobile device of claim 1, wherein payment can be made by fiat or crypto currency.

11. The mobile device of claim 1, wherein a seller can change and set price or time increments and post available time around schedule.

12. The mobile device of claim 1, wherein a seller can set time increments or price to become available now, wherein buyers can meet with the seller on a first come first serve basis.

13. The mobile device of claim 1, wherein a seller can set a reserve price by the minute, wherein buyers can request a seller's time if they meet the reserve.

14. The mobile device of claim 1, wherein the buyer, seller, or both can publish a review of a seller or buyer, respectively.

15. The mobile device of claim 1, wherein a buyer can make purchases actual and virtual during the connection or after.

16. The mobile device of claim 1, wherein the buyer, seller, or both can work with advertisers, brands, promotions, or a combination thereof to interact with the application.

17. The mobile device of claim 1, wherein the buyer, seller, or both can keep track of all monies in and out their respective accounts via an interactive bank.

18. The mobile device of claim 1, wherein the buyer, seller, or both can connect and disconnect via a notification.

19. The mobile device of claim 1, wherein the buyer, seller, or both can opt into receiving push notifications of scheduled and available time.

20. The mobile device of claim 1, wherein a seller can share available times and schedule via social media, text, email, and SMS.

* * * * *